United States Patent Office 3,233,741
Patented Feb. 8, 1966

3,233,741
FILTER AID AND METHOD OF PURIFYING LIQUIDS USING THE SAME
George R. Bell, Martinsville, N.J., assignor to Johns-Manville Corporation, New York, N.Y., a corporation of New York
No Drawing. Filed June 20, 1961, Ser. No. 118,276
4 Claims. (Cl. 210—500)

This invention relates to new methods of preparing filter aid products, to new mixtures utilized in preparing such products, to new filter aids produced therefrom, and to novel methods of filtration employing the new products. More particularly, this invention relates to the filtration clarification and purification of water to remove impurities therefrom and to the production of filter aids for use therein. The product used to accomplish such processes is obtained by new and novel methods of treating filter aid particles with metallic hydrates whereby the effectiveness of the filter aids for removing turbidity, coloring, bacteria, and other impurities from water supplies is improved.

HISTORY

As generally understood, filtration is the removal of suspended particles from a liquid by forcing the liquid under a pressure differential through a filter medium. While the original approach to water filtration was by means of sand beds, recent history has demonstrated that another approach may be more economical and practical, that being the use of filter aid filtration.

In theory the liquid or filtrate is to pass through the openings of the filter medium, such as a cloth, screen, etc., while the suspended particles are to remain behind. However, in reality, the finer suspended particles also pass with the liquid as the coarse openings of the medium are unable to retain them, while the larger particles do become filtered and remain upon the medium only soon to clog the openings and eventually slow down or completely stop the flow of liquid through the filter.

In present day filtration technology, the above-described difficulties have been for the most part overcome by adding a small amount of a filter aid to the liquid to be filtered. This filter aid functions to form continuously a porous cake and in actuality to entrap impurities by various mechanisms, such as by surrounding each particle of gummy solid to prevent the sliming over of the filter surface. The properties of the filter aid, e.g., porosity, fineness, diversities of shape, incompressibility, etc., make it unique for this purpose. A particularly important feature of filter aid filtration is that the holes in the face of the filter aid cake are far smaller than those in the filter medium, thereby enabling the removal of some substantial proportions of the suspended particles. The proportion removed will, of course, be a function of the size and nature of the particles to be removed, and the porosity and inherent clarifying ability of particular filter aids.

In order to increase the initial efficiency of the filtering process, a precoat of filter aid particles is provided on the filter cloth in addition to the incorporation of the particles within the liquid to be filtered. This keeps the main filter cake containing the impurities from coming into direct contact with the filter medium and, consequently, prevents the gummy particles from clogging the medium or lessening the filtration efficiency in the manners formerly confronting the filtration industry.

The materials most generally used as filter aids are diatomaceous silica, perlite, other siliceous materials, carbon, and fibrous matter such as asbestos and cellulose.

In one process of filtering water supplies, it has become conventional to form a mixture of the liquid containing the suspended impurities with a particular filter aid such as diatomaceous silica. As mentioned, the purpose of the filter aid is to continually impart a new filtering surface upon the filtering medium and thereby increase the efficiency of the filtration process by increasing the amount of impurities removed and likewise increasing the length of the filtration cycle. However, some difficulty remains due to the fact that even with the use of filter aids, it is sometimes impossible to economically remove certain impurities from supplies.

It has heretofore been determined that these impurities in various commercial water supplies are substantially electro-negative in character. It was thus devised that if an electro-positive filter aid could be provided, a more efficient and effective process could be devised to remove the electro-negative particles through the mutual attractiveness. One of the earliest teachings of such a process is that disclosed in the U.S. Letters Patent No. 2,036,254 to Cummins. Therein it was devised that diatomaceous silica and other fine or particulate filter aids may be treated so as to impart an electro-positive characteristic thereto.

To effect this, the diatomaceous silica was suspended in an aqueous medium and the coating of the electro-positive water-soluble material precipitated thereon. Generally, aluminum sulfate was added and precipitated by the addition of an alkali. Upon being so fixed, the particles were removed from the solution and dried at a temperature sufficiently low enough to maintain the electro-positive characteristic of the coating. However, this process has certain disadvantages because of the many additional steps of forming the coating, washing the particles, and drying before using. Such steps increase the cost of the particles and more importantly, decrease the activity of the filter aid.

Subsequent teachings, such as evidenced by the Frankenhoff patents, No. 2,468,188 and No. 2,468,189, have attempted the same thing through a somewhat different approach. The substance of the Frankenhoff invention was a method requiring the substantially simultaneous addition to the water of the filter aid and the water-soluble salts of particular trivalent metals. The salt was to be converted to a hydrate state solely through the effects of the natural alkalinity of the water medium, and it was thought that it becomes coated upon the filter aid particles. Particular limits were devised by Frankenhoff in order to effect this. He teaches that the ratio of the trivalent salt must be about 0.5 to about 5 parts per 100 parts of diatomaceous silica and that the proportion of the diatomaceous silica be no less than about 0.1 lb. per 1000 gals. of water. This is equivalent to about 0.001 percent by weight concentration of the filter aid as a minimum. He likewise teaches that it is preferable not to have more than 4 lbs. of diatomaceous silica for 1000 gals. of water, or about 0.04 percent weight by concentration as a maximum. All too frequently the above processes have not worked satisfactorily, either because of incomplete precipitation of the metallic hydrate with consequential contamination of the filtered product, or because of the high rates of head loss increase resulting in filter cycles so short as to be economically and operationally impractical.

OBJECTS

It is accordingly a principal object of this invention to provide a practical means whereby the deficiencies of the foregoing filtration processes are overcome.

It is a further object of this invention to provide a method of clarifying and substantially purifying water supplies wherein maximum effectiveness is achieved as to the removal of turbidity, color and other impurities.

It is another object of this invention to provide a new method of producing filter aids in which will economically function in accordance with the advantages mentioned in the foregoing objects.

It is a further object of this invention to provide a new and novel and more practical method of treating commercial filter aids to increase their effectiveness with regard to the clarification and purification of water supplies by the removal of impurities therefrom.

It is still another object of this invention to provide a method whereby filter aid particles may be effectively coated with materials without the necessity of any subsequent treatment before their ultimate use as a filter aid, thereby obtaining for the filter aid greater efficiencies such as sorptive activity.

It is another object of this invention to provide a practical means of purifying contaminated water sources to render them potable.

Other objects and further scope of applicability of the present invention will become apparent from the detailed description given hereinafter.

BRIEF DESCRIPTION OF THE INVENTION

The mechanics by which thin films of trivalent metal hydrates can be formed on filter aids or other finely divided materials may be illustrated by the following typical reaction:

$$Al_2(SO)_3 + 6Na(OH) \rightarrow 2Al(OH)_3 + 3Na_2SO_4$$

However, it has now been found that contrary to the previous teachings, the coating may be effected upon a filter aid surface only if, prior to effecting the formation of the hydroxide through the proper chemical reaction, the filter aid particles to be coated are first placed in suspension in such amounts so as to constitute at least 0.25 percent by weight in the medium and thereafter effect the precipitation to obtain the coated filter aid. That is, only with filter aid concentrations of 0.25 percent by weight or more, will a coating be insured upon the filter aid. Once the coating has been formed, the concentration may be appropriately reduced to as little as 0.001 percent or less without any loss in effectiveness. The coating may be applied by the suspension of the filter aid in the salt solution or suspension in water with subsequent or simultaneous addition of the salt, followed by the addition of the alkali. The actual order of addition of ingredients is not important except that the alkali and salt are not to be reacted prior to the formation of the proper concentration of the filter aid in suspension.

DETAILED DESCRIPTION OF THE INVENTION

A more complete understanding of the invention may be obtained by reference to the following examples of operations within the scope of this invention. In these examples all parts and percentages are by weight unless otherwise indicated.

A series of experimental runs were made in the laboratory using a particular filter apparatus and a very precise means of measuring head loss or pressure drop across the filter cake after formation. The apparatus consisted of a constant flow rate device with an attached manometer to measure the head loss. The filter septum comprised a 200 mesh screen having a filter area of 0.01125 sq. ft. precoated with 1.0 g. of "Celite 503" (a diatomaceous silica filter aid marketed by Johns-Manville Sales Corp.). A flow rate of approximately 2.15 g./sq. ft./min. was maintained. Readings of head loss were taken when the system achieved equilibrium. In each case this consisted of about a 10-minute interval. The water treated was maintained in a constant condition for all examples.

Example I

In the first set of runs (1–7), 0.12 g. of "Celite 545" (a diatomaceous filter aid product marketed by Johns-Manville Sales Corp.) was slurried in 450 ml. of water. This effected a 0.024 percent by weight concentration. To this was added 24 ml. of an alum solution containing 0.0105 g. of aluminum sulfate. This was followed by 24 ml. of a sodium hydroxide solution containing 0.0037 g. of the sodium hydroxide. The method used was that advocated by Frankenhoff except that demineralized water was used so that a molar amount of alkali was needed to cause precipitation. The average net head loss for two sets of the runs, 1–4 and 5–7, were 23.00 and 26.37 in. of water respectively.

Example II

In this run (8) the same amounts of materials were employed. However, the aluminum hydrate was precipitated in the water supply prior to the addition of the filter aid. A head loss of 26.50 in. of water was recorded. This led to the conclusion that the high head losses encountered in Example I can be attributed to the failure of the aluminum hydrate to coat the filter aid particles thereby remaining free to clog the filter.

Example III

An additional set of runs (9–16) was made utilizing the method of the instant invention. That is, the same amount of diatomaceous silica was added to the water, but the amount of water was controlled so as to effect a 0.25 percent by weight concentration of diatomaceous silica. The precipitation of the aluminum hydrate was then effected utilizing the same amount of added chemicals as used in Examples I and II. The average head loss for the two sets of runs was 9.33 and 7.68 in. of water, respectively.

All data and procedures are tabulated below in Table 1.

TABLE 1

[1.0 g. Celite 503 precoat applied from 300 ml. water used to filter 0.120 g. Celite 545 batch filter aid in 500 ml. Total volume with the filter aid treated as described under "method of application" below]

| Example | Run | Celite 545 Weight | Celite 545 Percent | Aluminum Sulfate Weight | Aluminum Sulfate Percent | NaOH Weight | NaOH Percent | Method of Application | Net $\Delta$ P $H_2O$ |
|---|---|---|---|---|---|---|---|---|---|
| I | 1 | 0.120 | 0.024 | 0.0105 | 0.00205 | 0.0037 | 0.00074 | 545 in 450 ml. H₂O Add 24 ml. Alum Sol., Add 24 ml. NaOH Sol. | 23.20 |
| | 2 | | | | | | | | 21.20 |
| | 3 | | | | | | | | 24.30 |
| | 4 | | | | | | | | 23.30 |
| | | | | | | | | Group Average | 23.00 |
| | 5 | 0.120 | 0.024 | 0.0105 | 0.00205 | 0.0037 | 0.00074 | 545 in 450 ml. H₂O Add 24 ml. Alum Sol., Add 24 ml. NaOH Sol. | 27.40 |
| | 6 | | | | | | | | 26.30 |
| | 7 | | | | | | | | 25.40 |
| | | | | | | | | Group Average | 26.37 |

TABLE 1—Continued

| Example | Run | Celite 545 | | Aluminum Sulfate | | NaOH | | Method of Application | Net Δ P H₂O |
|---|---|---|---|---|---|---|---|---|---|
| | | Weight | Percent | Weight | Percent | Weight | Percent | | |
| II | 8 | 0.120 | 0.024 | 0.0105 | 0.00205 | 0.0037 | 0.00074 | 450 ml. H₂O+24 ml. Alum+24 ml. NaOH, Add 545 just before filt. | 26.50 |
| | 9 | ¹0.120 | 0.25 | ¹0.0105 | 0.0214 | ¹0.0037 | 0.0077 | Add F.A. to 24 ml. Alum Sol., add 24 ml. NaOH, then add 450 ml. H₂O. | 9.25 |
| | 10 | | | | | | | | 9.40 |
| | | | | | | | | Group Average | 9.33 |
| III | 11 | ¹0.120 | 0.25 | ¹0.0105 | 0.0214 | ¹0.0037 | 0.0077 | Add F.A. to 24 ml. Alum Sol., add 24 ml. NaOH, then add 450 ml. H₂O. | 8.45 |
| | 12 | | | | | | | | 7.60 |
| | 13 | | | | | | | | 7.60 |
| | 14 | | | | | | | | 7.25 |
| | 15 | | | | | | | | 7.00 |
| | 16 | | | | | | | | 8.15 |
| | | | | | | | | Group Average | 7.68 |

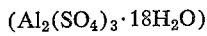
¹ As ppt'd.

The importance and verity of the above examples were further evidenced in a series of parallel filtration runs. In order to properly determine the actual comparison or contrastability of the instant invention and the materials prepared in accordance with the above-mentioned methods of the prior art, two parallel filter units were simultaneously operated on a single source of raw untreated river water. For one unit a filter aid material was prepared in accordance with the instant invention. For the second unit a material was prepared in accordance with the preferred method of the Frankenhoff patent, discussed above (hereinafter referred to as "Prior Art X"), wherein the same amounts of materials were used except that no alkaline reagent was employed. The filters each contained 2.7 sq. ft. of filtering surface in the form of commercially available tubular elements having trapezoidal, stainless steel wires. By means of a highly instrumented control circuit, the flow rate was controlled at 1 gal./sq. ft./min. and the rate of head loss increase recorded. The unit was precoated by direct addition of the slurry to the filter tank after which the filtrate was then recirculated through the filter and filtered water tank. Body feed was added to the feed line from a slurry tank by means of two precise pumps with a common driving mechanism. Identical amounts of filter aids prepared in accordadnce with the respective methods were continuously added to the raw water being filtered.

*Example IV*

A filter aid was prepared in accordance with the instant invention whereby a mixture "A" was used employing 3.75 percent commercial aluminum sulfate $$(Al_2(SO_4)_3 \cdot 18H_2O)$$

based on the weight of diatomaceous silica filter aid (Celite 545). Approximately 1.6 percent soda ash (sodium carbonate) was added in order to achieve a pH of the mixture between 5.6 and 6. This mixture was prepared dry. The mixture was added to water to make a slurry containing at least a 0.25 percent concentration of the diatomaceous silica filter aid. The resulting product in the slurry possessed a 1 percent aluminum hydrate coating. This slurry was then added to one of the parallel filtration lines from the raw water source. To the second parallel line was added a slurry containing the same weights of Celite 545 and aluminum sulfate. In order to comply with the teaching of the Prior Art X procedure, wherein it is taught that precipitation of the hydrate is to be effected solely by the alkalinity of the unfiltered water, no additional reagents were added. The respective rates of head loss increase were measured and since the amount of chemicals used was of a relatively small order, the difference in rates of head loss increase was small as expected. Nevertheless, the instant invention product demonstrated a lower rate of head loss increase.

*Example V*

A filter aid was prepared from a mixture "B" in the same manner as above in Example IV, except that approximately twice the amount of chemicals were used. This resulted in a 2 percent by weight aluminum hydrate coated product to represent the instant invention. Likewise a slurry was prepared in accordance with the teaching of Prior Art X, using the same amounts of filter aid and aluminum sulfate as used to make mixture "B." Here too no additional alkaline reagent was used. The rate of head loss increase proved to be less than half as much for the instant invention than did the head loss rate for the Prior Art X product over the same period of time.

*Example VI*

The same procedure used above in Example IV was followed to prepare mixture "C," except that the aluminum sulfate was replaced by ferric sulfate. Likewise the amount of sulfate used was 5 percent by weight and the amount of soda ash 3 percent by weight. The resulting filter aid when slurried had a pH of between 5 and 6 and contained approximately 2 percent by weight ferric hydrate coating. The relative rates of head loss increase for the mixture of the instant invention were approximately ⅙ that of the Prior Art X product, utilizing the same amounts of diatomaceous silica and ferric sulfate.

*Example VII*

Mixture "D" was prepared, doubling the amount of added chemicals utilized in Example VI and then slurried. The corresponding slurry was prepared in accordance with Prior Art X teaching. The rate of head loss increase for the mixture of the present invention was relatively moderate as compared with a rather prohibitive head loss rate developed using Prior Art X filter aid.

It should be pointed out that the differences in head loss are quite dependent upon the turbidity of the raw water filtered. For instance, in Example V the turbidity was low, being on the order of only 4 p.p.m., and the Prior Art X filter aid developed a rate of head loss increase of about 10.5 p.s.i. in 12.0 hr. This rate would appear better than that of the instant invention in Examples IV and VII. However, in each of those situations the raw water turbidity was at least twice that of Example V. Consequently, the head loss rates should be compared only with regard to the specific run to which they pertain.

*Examples VIII, IX and X*

Additional runs were made utilizing the same mixtures as prepared in Example VII. In each of these runs the raw water turbidity was relatively high which resulted in a rate of head loss increase so high for the Prior Art X materials that the tests had to be terminated after a very short time. The differentials between the rates for the Prior Art X material and that of the instant invention ranged between 15–25 to 1.

It is believed conclusively that these data for Examples VIII, IX and X wherein a large amount of ferric sulfate was used, demonstrate the fact that trivalent metal hydrate is indeed more effective when actually coated upon the filter aid particles and that the filter aid material prepared in accordance with the prior art practice does not possess such coatings. Consequently, such materials are free to quickly clog the filter cake to cause the high head loss with the resulting relatively short cycle. The data representing Examples IV through X are presented below in Table 2.

TABLE 2.—COMPARISON OF INVENTION WITH PRIOR ART X—CELITE 503 USED AS THE PRECOAT

| Example | Average Raw Water Turbidity (p.p.m.) | Cycle Length, hr. | Invention Filter Aid Mixture | ΔP, p.s.i. | Prior Art X Product | ΔP, p.s.i. |
|---|---|---|---|---|---|---|
| IV | 8 | 12.0 | A | 14.0 | Alum-filter aid slurry | 17.0 |
| V | 4 | 12.0 | B | 5.5 | ----do---- | 10.5 |
| VI | 23 | 12.0 | C | 4.5 | $Fe_2(SO_4)_3$-filter aid slurry | 27.0 |
| VII | 10 | 12.0 | D | 13.0 | ----do---- | 31.0 |
| VIII | 19 | 2.0 | D | 1.5 | ----do---- | 40.0 |
| IX | 15 | 2.5 | D | 2.0 | ----do---- | 42.0 |
| X | 14 | 3.5 | D | 1.5 | ----do---- | 37.5 |

*Examples XI thru XIV*

In another series of tests the instant invention was contrasted with yet another prior art material, the filter aids prepared in accordance with the Cummins patent, above-mentioned (hereinafter referred to as "Prior Art Y"). The same four mixtures "A," "B," "C" and "D," as used above, were evaluated. For these tests each set of products utilized the same amount of alkali in addition to equal amounts of diatomaceous silica and metallic sulfate. The method of Freundlich was used to compare the adsorptive activity in which an isotherm is obtained for a series of sample weights by plotting the log of adsorption per gram versus the log of residual concentration. The test medium was a lubricating oil-in-water emulsion having a value of 275–295 units of oil content. (Oil content is expressed in arbitrary units as evaluated by Tyndall metric methods. These emulsions follow Beer's law so light scattering methods may be used to determine relative concentration instead of tedious gravimetric methods.) The materials were prepared in accordance with the respective inventions and contacted with the oil emulsion for ½ hr. with shaking at 5 min. intervals, and subsequently filtered through cheesecloth. It should be noted that a filter aid material, such as diatomaceous silica, without any additional chemical treatment has no activity when tested by this method. A rate of 100 percent was assigned whenever possible to the Prior Art Y results. The results of these tests are recorded below in Table 3. These results indicate substantially greater sorptive activity is obtainable through the use of the product of the instant invention as evidenced by the removal of oil from condensate. Since oil in condensate represents a common industrial problem, the product of the instant invention has application in this field.

It is significant to note that the instant product is different from Cummins' product, and the difference is believed based upon the insitu coating of the instant invention which does not necessitate or warrant any subsequent treatment such as washing and drying. As explained above, these post coating steps seriously affect the activity of the product.

Various materials may be used as the basic substance for the coating by the metal hydroxide. While diatomaceous silica is the preferred embodiment, other commercially available materials such as perlite, fly ash, asbestos fibers, cellulose fibers and the like, or mixtures

TABLE 3.—COMPARISON OF SORPTIVE ACTIVITY OF INSTANT INVENTION WITH PRIOR ART Y

| Ex. | Chemical Composition Used | Prior Art Y Activity, Percent | Invention Activity, Percent |
|---|---|---|---|
| XI | A | 100 | 156 |
| XII | B | 100 | 176 |
| XIII | C | (¹) | ² 147 |
| XIV | D | 100 | 223 |

¹ No Activity.
² As compared to Prior Art Y Product "D".

thereof, are also contemplated within the scope of the instant invention.

The formation of the coating is effected by the proper addition of an alkali to produce an ultimate pH value between 4 and 7 with a pH of between 5 and 6.5 being preferred. While this is generally accomplished by the use of sodium carbonate, other alkali materials such as potassium hydroxide, ammonium hydroxide, sodium hydroxide, calcium hydroxide, and the like, may be used. The use of agents other than the naturally occurring materials to produce the flocculant is highly advantageous as it permits the use of controlled amounts of alkalinity to insure complete precipitation and coating. Moreover, because of the large amounts of chemicals used to effect the precipitation, it is possible to substantially nullify any effects of the naturally occurring alkaline materials. Thus these natural materials have no consequence on the coating.

Also, there may be used soluble compounds or salts of metals other than aluminum or iron, these two, however, being the preferred species, to produce the precipitated coating upon the surface of the filter aid. It is important that the compound so selected contain a metal ion that will form a water-insoluble hydroxide when subjected to the alkaline reagent in an aqueous medium. Metals which meet these requirements include the trivalent or tetravalent metals such as chromium and thorium. It is understood that the selection of the various ingredients is such as to make them consistent with the desired results and other factors such as the economics of the process.

The amount of chemicals added may vary dependent on the intended product. That is, dependent on the amount of hydrate desired for the particular filter aid, the amount of metallic salt and alkaline reagent are varied. The minimum amount of $Al(OH)_3$ coating from which benefits might be expected is about 0.5 percent. It is reasonable to expect that some minimum amount of active coating will be required to gain benefits from the product of the invention. Since $Fe(OH)_3$ is both a heavier compound and apparently somewhat less active, more of it, for example, about 1 percent, may be necessary as a minimum amount of coating.

The maximum coating which can be tolerated is that which does not "clutter up" the filter aid structure to the point that the coated material no longer functions as a filter aid. For $Al(OH)_3$-coated materials the maximum amount is probably on the order of about 10 percent as $Al(OH)_3$. For $Fe(OH)_3$ coatings the maximum is on the order of about 20 percent. It is noted, however, that greater amounts may be used in certain applications if the problem of gumming the filter aid is not an essential factor. With regard to other metallic hydrates, the amount of material useful will be dependent on the same facts. The amount of sulfate or other salts used to effect the hydrate will be determinable in accordance with standard stoichiometric principles. Thus for aluminum sulphate it may vary between 1.875 percent and 37.50 percent by weight of the finely divided material. Regarding the ferric sulfate, it may vary between 2.5 percent and 50 percent by weight of finely divided filler material. A minimum amount of about 1 percent of the salt based on the weight of filter aid is believed accurate. The amount of alkaline reagent, e.g., sodium carbonate, is dependent on the amount of salt used and the pH control.

CONCLUSION

From the foregoing description, it is readily seen that a new filter aid material with new and highly desirable properties has been produced. The in situ coated filter aid possessed properties heretofore not obtainable from similar products. The coating is effected only by following the instant procedure.

The percentage removal of impurities coupled with the outstanding head loss characteristics indeed makes this new product commercially desirable.

It is believed the above provides a complete description of the invention in such manner as to distinguish it from other inventions and from what is old, and provides a description of the best mode contemplated of carrying out the invention and thereby complies with the patent statutes.

It is also understood that in accordance with further provisions of the patent statutes, variations and modifications of the invention, as illustrated by specific examples herein, may be made without departing from the spirit of the invention. It is to be understood that the scope of the invention is not to be interpreted as limited to the specific embodiments disclosed herein but only in accordance with the appended claims, when read in the light of the foregoing description.

What I claim is:

1. A composition of matter consisting essentially of a mixture of a filter aid consisting of finely divided, inert solid particles, a flocculating inorganic salt selected from the group consisting of salts of trivalent metals salts of tetravalent metals, and mixtures thereof and an inorganic alkaline reagent in an amount to provide a pH of between 4 and 7 when said composition is suspended in water at a filter aid concentration of at least 0.25% by weight, said trivalent metallic salt and said tetravalent metallic salt being convertible to an insoluble metallic hydroxide when in suspension and in the presence of said alkaline reagent, and present in an amount so as to provide between 0.5 and 50% metallic hydroxide calculated on the weight of the filter aid.

2. A composition as defined in claim 1 wherein the filter aid is selected from the group consisting of diatomaceous silica, perlite, and mixtures thereof, and the flocculating inorganic salt is selected from the group consisting of aluminum sulfate and iron sulfate.

3. A continuous method for purifying a liquid containing suspended particles comprising, diverting a portion of said liquid, incorporating filter aid consisting of finely divided, inert solid particles in said portion of said liquid to produce at least a 0.25% by weight concentration of said filter aid therein, and while in such a concentrated condition precipitating a metal hydroxide coating on said filter aid in an amount between 0.5 and 50% by weight of the filter aid effected by a reaction between a flocculating inorganic salt and an amount of an inorganic alkaline reagent to provide a pH of between 4 and 7, said salt being selected from the group consisting of salts of trivalent metals, salts of tetravalent metals, and mixtures thereof, returning said portion to said liquid, and thereafter directly purifying said liquid by filter aid filtration.

4. A method as defined in claim 3 wherein the filter aid is selected from the group consisting of diatomaceous silica, perlite, and mixtures thereof.

References Cited by the Examiner

UNITED STATES PATENTS

| 2,036,258 | 4/1936 | Cummins | 210—500 XR |
| 2,468,188 | 4/1949 | Frankenhoff | 210—500 XR |

JULIUS GREENWALD, *Primary Examiner.*

CARL F. KRAFFT, ALBERT T. MEYERS, *Examiners.*